United States Patent
Ye

(10) Patent No.: US 9,841,852 B2
(45) Date of Patent: Dec. 12, 2017

(54) TOUCH SCREEN AND TERMINAL DEVICE COMPRISING SAME

(71) Applicant: Shenzhen China Star Optoelectronics Technology Co., Ltd., Shenzhen, Guangdong (CN)

(72) Inventor: Chengliang Ye, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 122 days.

(21) Appl. No.: 14/436,897

(22) PCT Filed: Jan. 29, 2015

(86) PCT No.: PCT/CN2015/071823
§ 371 (c)(1),
(2) Date: Apr. 19, 2015

(87) PCT Pub. No.: WO2016/115750
PCT Pub. Date: Jul. 28, 2016

(65) Prior Publication Data
US 2016/0342237 A1 Nov. 24, 2016

(30) Foreign Application Priority Data
Jan. 23, 2015 (CN) .......................... 2015 1 0035767

(51) Int. Cl.
*G06F 3/045* (2006.01)
*G06F 3/044* (2006.01)
*G06F 1/16* (2006.01)
*G06F 3/041* (2006.01)

(52) U.S. Cl.
CPC ............ *G06F 3/044* (2013.01); *G06F 1/1626* (2013.01); *G06F 1/1643* (2013.01); *G06F 3/0418* (2013.01); *G06F 2203/04103* (2013.01)

(58) Field of Classification Search
CPC ....................................................... G06F 3/044
USPC .................................... 345/156–184; 349/12
See application file for complete search history.

(56) References Cited

U.S. PATENT DOCUMENTS

| | | | | |
|---|---|---|---|---|
| 6,400,359 | B1* | 6/2002 | Katabami | G06F 3/044 345/173 |
| 8,766,935 | B2* | 7/2014 | Matsuo | G06F 3/044 345/173 |
| 9,471,175 | B2* | 10/2016 | Kuo | G06F 3/0416 |
| 2003/0067449 | A1* | 4/2003 | Yoshikawa | G06F 3/016 345/173 |
| 2004/0100452 | A1* | 5/2004 | Oh | G06F 3/045 345/173 |
| 2008/0024461 | A1* | 1/2008 | Richter | G06F 3/044 345/173 |

(Continued)

*Primary Examiner* — Prabodh M Dharia
(74) *Attorney, Agent, or Firm* — Andrew C. Cheng

(57) ABSTRACT

Disclosed are a touch screen and a terminal device. The touch screen includes a first ancillary electrode and a second ancillary electrode. The first ancillary electrode is arranged in a first marginal zone of the touch screen. The second ancillary electrode is arranged in second marginal zone that is opposite to the first marginal zone. The touch screen includes additional ancillary electrodes to increase the touch accuracy at an edge of the touch screen so as to enhance the performance of the touch screen, allowing for easy touch operation conducted by a user.

14 Claims, 7 Drawing Sheets

(56) References Cited

U.S. PATENT DOCUMENTS

| | | | | |
|---|---|---|---|---|
| 2008/0079697 A1* | 4/2008 | Lee | G06F 3/0412 | 345/173 |
| 2010/0245135 A1* | 9/2010 | Camacho | G06F 1/1626 | 341/33 |
| 2011/0128114 A1* | 6/2011 | Kimura | G06F 3/045 | 338/13 |
| 2012/0050201 A1* | 3/2012 | Nozawa | G06F 3/0416 | 345/173 |
| 2012/0062502 A1* | 3/2012 | Chen | G06F 3/045 | 345/174 |
| 2012/0235691 A1* | 9/2012 | Ho | G06F 3/0418 | 324/658 |
| 2013/0300691 A1* | 11/2013 | Huang | G06F 3/044 | 345/173 |
| 2013/0314625 A1* | 11/2013 | Tsai | G06F 3/044 | 349/12 |
| 2014/0152915 A1* | 6/2014 | Lu | G06F 1/1643 | 349/12 |
| 2014/0347319 A1* | 11/2014 | Lin | G06F 3/044 | 345/174 |
| 2015/0035642 A1* | 2/2015 | Huang | G06F 3/045 | 338/47 |
| 2015/0042908 A1* | 2/2015 | Wang | G06F 3/041 | 349/12 |
| 2015/0084912 A1* | 3/2015 | Seo | G06F 3/0412 | 345/174 |
| 2015/0212615 A1* | 7/2015 | Hu | G06F 3/044 | 345/174 |
| 2015/0234503 A1* | 8/2015 | Min | G06F 3/047 | 345/173 |
| 2015/0338959 A1* | 11/2015 | Xie | G06F 3/044 | 345/174 |
| 2016/0004360 A1* | 1/2016 | Kurashima | G06F 3/044 | 345/174 |
| 2016/0018915 A1* | 1/2016 | Kuo | G06F 3/0416 | 345/173 |
| 2016/0098109 A1* | 4/2016 | Choi | G06F 3/044 | 345/174 |
| 2016/0098110 A1* | 4/2016 | Choi | G06F 3/0416 | 345/173 |
| 2016/0132157 A1* | 5/2016 | Lee | G06F 3/044 | 345/174 |
| 2016/0179262 A1* | 6/2016 | Li | G06F 3/044 | 345/174 |
| 2016/0195971 A1* | 7/2016 | Ando | G06F 3/044 | 345/174 |

\* cited by examiner

TOUCH SCREEN AND TERMINAL DEVICE COMPRISING SAME

CROSS REFERENCE TO RELATED APPLICATIONS

This application claims the priority of Chinese Patent Application No. 201510035767.2, entitled "Touch Screen and Terminal Device Comprising Same", filed on Jan. 23, 2015, the disclosure of which is incorporated herein by reference in its entirety.

BACKGROUND OF THE INVENTION

1. Field of the Invention

The present invention relates to the field of communication technology, and in particular to a touch screen and a terminal device comprising the touch screen.

2. The Related Arts

With the vivid and prosperous development of the communication industry, the application of touch terminal devices with touch screens is getting increasingly wide. The touch screen is the simplest and most natural interaction between human beings and machines and is commonly used in various fields, such as inquiry of public information, office operation, industrial control, military commanding, electronic games, song picking and dish ordering, multimedia teaching, estate related matters, and personal mobile terminal devices. However, to conduct a touch operation at an edge portion of a conventional touch screen, compared to a touch operation conducted in a central zone of the touch screen, the edge zone of the touch screen has a relatively small touch area for the touch operation and this leads to reduced touch control accuracy in the edge of the touch screen, so that erroneous operations may readily result, causing troubles to the users.

SUMMARY OF THE INVENTION

An embodiment of the present invention provides a touch screen, which improves touch control accuracy of an edge of a touch screen by way of adding an ancillary electrode.

An embodiment of the present invention provides a touch screen, which comprises: a first ancillary electrode and a second ancillary electrode, wherein the first ancillary electrode is arranged in a first marginal zone of the touch screen and the second ancillary electrode is arranged in a second marginal zone opposite to the first marginal zone.

In a preferred example of the embodiment of the present invention, the first ancillary electrode has a length less than or equal to a length of the first marginal zone.

In a preferred example of the embodiment of the present invention, the second ancillary electrode has a length less than or equal to a length of the second marginal zone.

In a preferred example of the embodiment of the present invention, the first marginal zone and the second marginal zone each comprise an area from an edge of a touch zone of the touch screen to an outer frame of the touch screen.

In a preferred example of the embodiment of the present invention, the touch screen comprises a capacitive touch screen.

Correspondingly, an embodiment of the present invention also comprises a terminal device. The terminal device comprises a touch screen. The touch screen comprises a first ancillary electrode and the second ancillary electrode, wherein the first ancillary electrode is arranged in a first marginal zone of the touch screen and the second ancillary electrode is arranged in a second marginal zone opposite to the first marginal zone.

In a preferred example of the embodiment of the present invention, the first ancillary electrode has a length less than or equal to a length of the first marginal zone.

In a preferred example of the embodiment of the present invention, the second ancillary electrode has a length less than or equal to a length of the second marginal zone.

In a preferred example of the embodiment of the present invention, the first marginal zone and the second marginal zone each comprise an area from an edge of a touch zone of the touch screen to an outer frame of the touch screen.

In a preferred example of the embodiment of the present invention, the touch screen comprises a capacitive touch screen.

Compared to the prior art, the touch screen according to the embodiment of the present invention comprises additional ancillary electrodes to increase the touch accuracy at an edge of the touch screen so as to enhance the performance of the touch screen, allowing for easy touch operation conducted by a user.

BRIEF DESCRIPTION OF THE DRAWINGS

To more clearly explain the technical solutions proposed in embodiments of the present invention or those of the prior art, a brief description of the drawings that are necessary for describing the embodiments of the present invention or those of the prior art is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to technical solutions of the embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Figure 1:
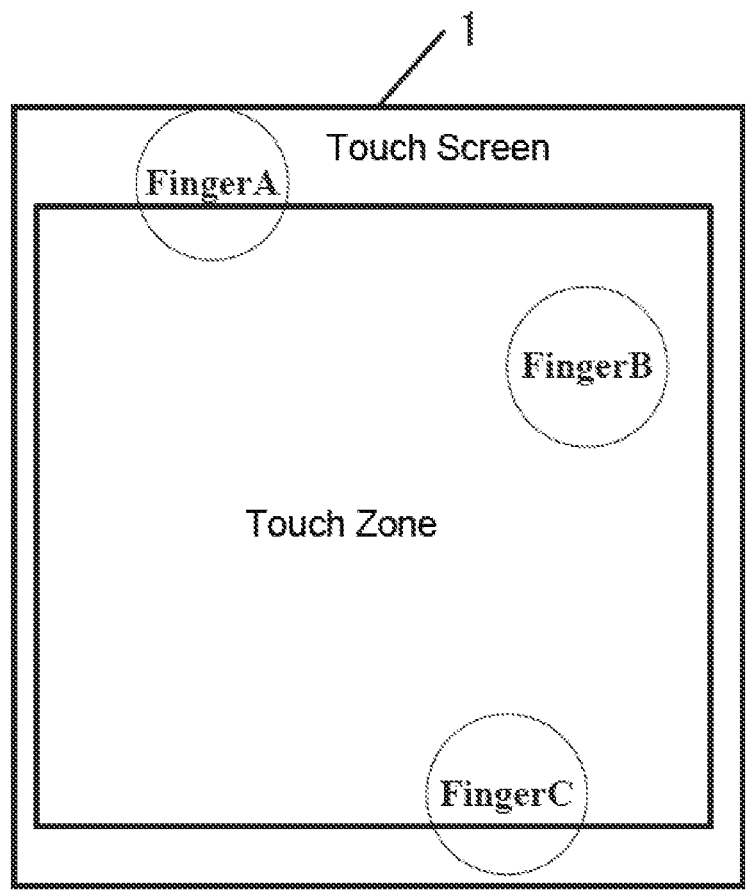
FIG. 1 is a schematic view showing a conventional touch screen.

Referring to FIG. 1, which is a schematic view showing a conventional touch screen, it can be seen from FIG. 1 that if a finger B touches a central touch zone, then the touch accuracy and touch precision would be high, and if a finger A or a figure C touches an edge zone of the touch screen, then the touch accuracy and the touch precision would be low, affecting the use by a user and making the user's experience poor.

Figure 2:
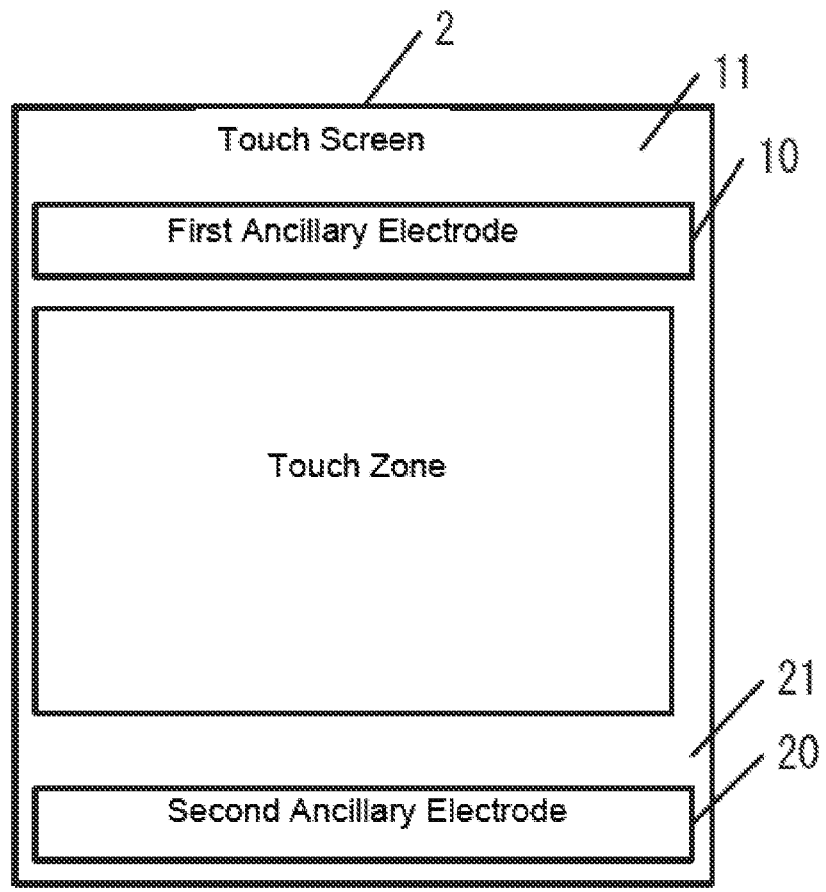
FIG. 2 is a schematic view showing a touch screen according to a preferred embodiment of the present invention.

Referring to FIG. 2, which is a schematic view showing a touch screen according to a preferred embodiment of the present invention, the touch screen 2 according to the preferred embodiment of the present invention comprises: a first ancillary electrode 10 and a second ancillary electrode 20, wherein the first ancillary electrode 10 is arranged in a first marginal zone 11 of the touch screen 1 and the second ancillary electrode 20 is arranged in a second marginal zone 21 opposite to the first marginal zone 11.

It is appreciated that a length of the first ancillary electrode 10 is less than or equal to a length of the first marginal zone 11 and a length of the second ancillary electrode 20 is less than or equal to a length of the second marginal zone 21. Adding the first ancillary electrode 10 and the second ancillary electrode 20 at locations outside a touch zone of the touch screen expands an effective touch area at edges of the touch screen and increases touch accuracy.

It needs to known that the first marginal zone 11 and the second marginal zone 21 each comprise an area from an edge of the touch zone of the touch screen to an outer frame of the touch screen. Such an area is provided with no electrode in the prior art devices so that such an area generally does not respond or generates incorrect response when touched by a finger, giving extremely low touch accuracy.

The touch screen according to the embodiment of the present invention is generally applicable to a capacitive touch screen.

Figure 3:
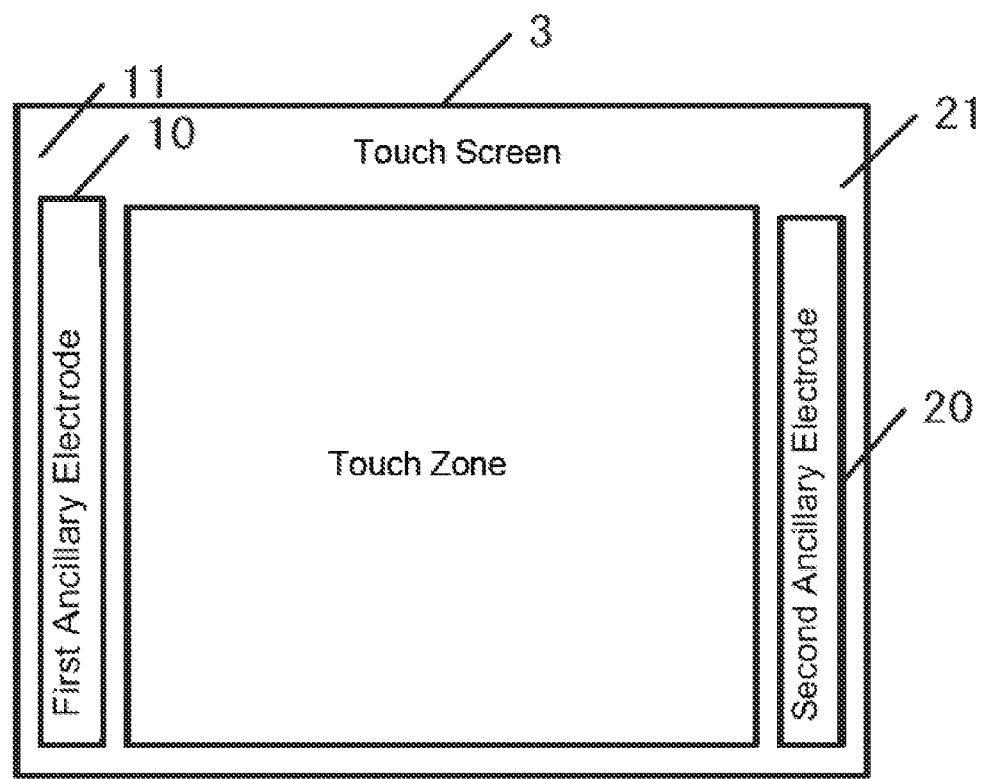
FIG. 3 is a schematic view showing a touch screen according to another preferred embodiment of the present invention.

It is apparent that, as shown in FIG. 3, which is a schematic view showing a touch screen according to another preferred embodiment of the present invention, the touch screen 3 according to the embodiment of the present invention comprises a first ancillary electrode 10 and a second ancillary electrode 20 that are respectively arranged in leftward and rightward edges of the touch screen that are opposite to each other. This arrangement similarly expands an effective touch area at the edges of the touch screen and increase the touch accuracy.

Figure 4:
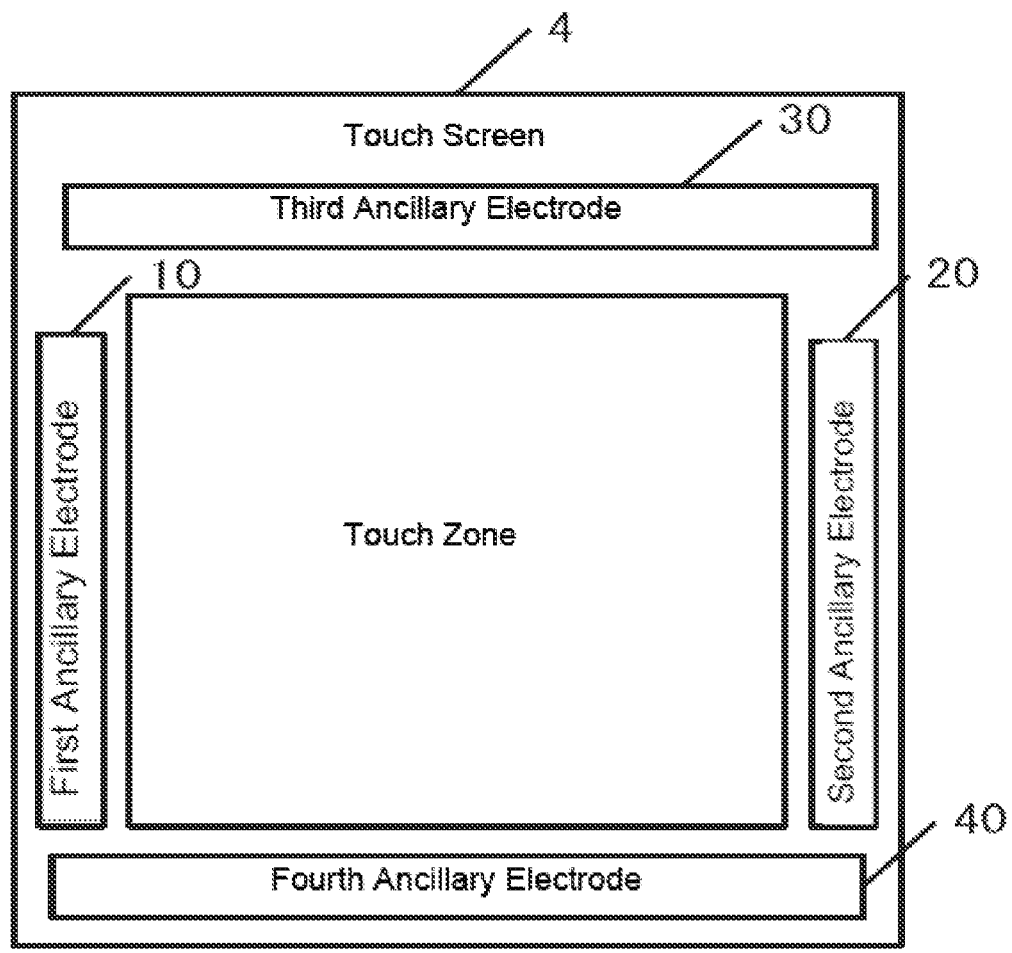
FIG. 4 is a schematic view showing a touch screen according to a further preferred embodiment of the present invention.

Referring to FIG. 4, which is a schematic view showing a touch screen according to a further preferred embodiment of the present invention, in a feasible embodiment of the present invention, the touch screen 4 can be further provided with an additional third ancillary electrode 30 and fourth ancillary electrode 40, so that four edge zones of the touch screen are all provided with ancillary electrodes to effectively expand an effective touch area at the edges of the touch screen and increase the touch accuracy.

Compared to the prior art, the touch screens according to the embodiments of the present invention comprise additional ancillary electrodes to increase the touch accuracy at an edge of the touch screen so as to enhance the performance of the touch screen, allowing for easy touch operation conducted by a user.

Figure 5:
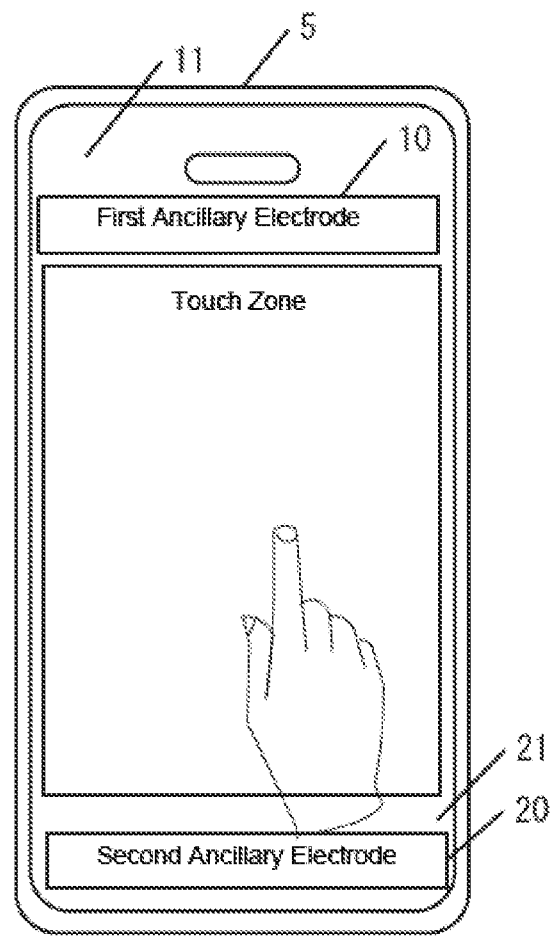
FIG. 5 is a schematic view showing a terminal device according to a preferred embodiment of the present invention.

Referring to FIG. 5, which is a schematic view showing a terminal device according to a preferred embodiment of the present invention, the terminal device according to the embodiment of the present invention may comprise a terminal device with a touch screen, such as a tablet computer, a mobile phone, an electronic reader, a personal computer (PC), a notebook computer, a vehicle-carrying device, a payment terminal, and a queue terminal. The terminal devices mentioned above are just few examples, not exclusively, including but not limited to the above mentioned.

Illustration of the terminal device according to the embodiment of the present invention will be given by taking a mobile phone as an example, which comprises a touch screen and the touch screen comprises: a first ancillary electrode 10 and a second ancillary electrode 20, wherein the first ancillary electrode 10 is arranged in a first marginal zone 11 of the terminal device touch screen 5 and the second ancillary electrode 20 is arranged in a second marginal zone 21 opposite to the first marginal zone 11.

It is appreciated that a length of the first ancillary electrode 10 is less than or equal to a length of the first marginal zone 11 and a length of the second ancillary electrode 20 is less than or equal to a length of the second marginal zone 21. Adding the first ancillary electrode 10 and the second ancillary electrode 20 at locations outside a touch zone of the touch screen expands an effective touch area at edges of the touch screen and increases touch accuracy.

It needs to known that the first marginal zone 11 and the second marginal zone 21 each comprise an area from an edge of the touch zone of the touch screen to an outer frame of the touch screen. Such an area is provided with no electrode in the prior art devices so that such an area generally does not respond or generates incorrect response when touched by a finger, giving extremely low touch accuracy.

The touch screen according to the embodiment of the present invention is generally applicable to a capacitive touch screen.

Figure 6:
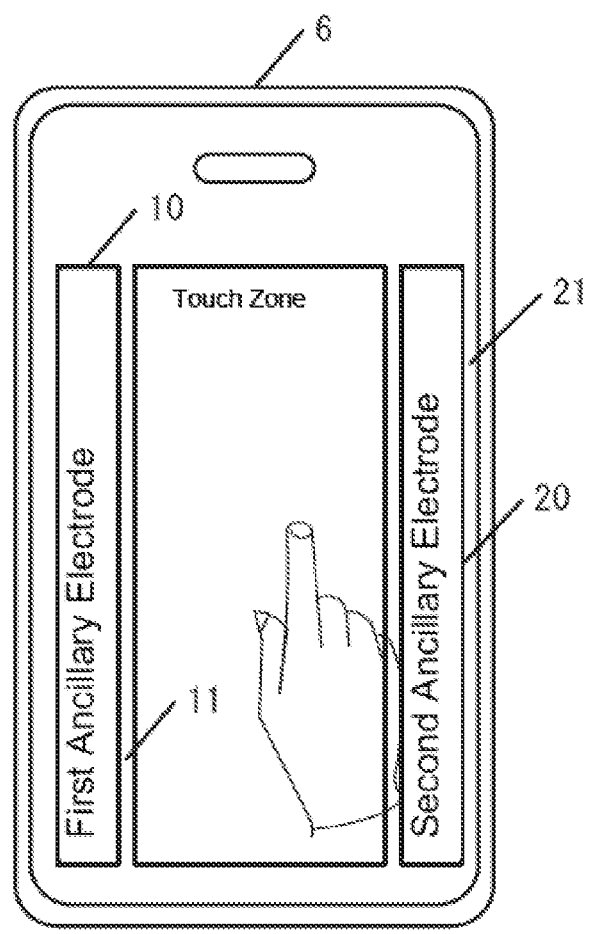
FIG. 6 is a schematic view showing a terminal device according to another preferred embodiment of the present invention.

It is apparent that, as shown in FIG. 6, which is a schematic view showing a terminal device according to another preferred embodiment of the present invention, the terminal device touch screen 6 according to the embodiment of the present invention comprises a first ancillary electrode 10 and a second ancillary electrode 20 that are respectively arranged in leftward and rightward edges of the touch screen that are opposite to each other. This arrangement similarly expands an effective touch area at the edges of the touch screen and increase the touch accuracy.

Figure 7:
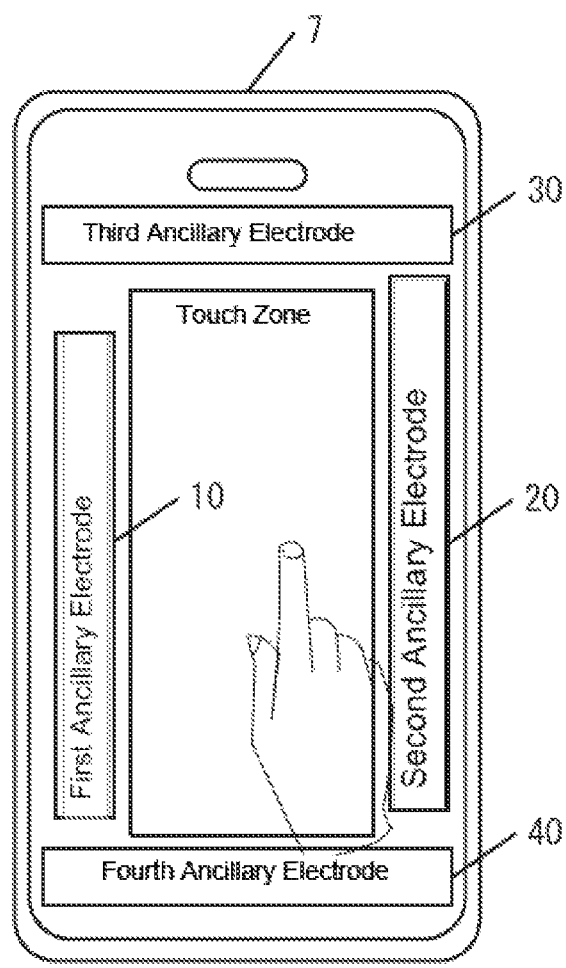
FIG. 7 is a schematic view showing a terminal device according to a further preferred embodiment of the present invention.

Referring to FIG. 7, which is a schematic view showing a terminal device according to a further preferred embodiment of the present invention, in a feasible embodiment of the present invention, the terminal device touch screen 7 can be further provided with an additional third ancillary electrode 30 and fourth ancillary electrode 40, so that four edge zones of the touch screen are all provided with ancillary electrodes to effectively expand an effective touch area at the edges of the touch screen and increase the touch accuracy.

Compared to the prior art, the touch screens according to the embodiments of the present invention comprise additional ancillary electrodes to increase the touch accuracy at an edge of the touch screen so as to enhance the performance of the touch screen, allowing for easy touch operation conducted by a user.

It is appreciated that the above mentioned first ancillary electrode, second ancillary electrode, third ancillary electrode, and fourth ancillary electrode are not provided for indicating a sequential relationship, but just for distinguishing different electrodes. Similarly, the first marginal zone and the second marginal zone are not provided just for indicating different marginal zones. Redundancy will be omitted.

The above illustrates only a preferred embodiment according to the present invention and is not intended to limit the scope of right of the present invention. Those having ordinary skills of the art would appreciate that various equivalent modifications that achieve all or some of the operations of the above-described embodiment and fall within scope of the attached claims are considered within the scope covered by the present invention.

What is claimed is:

1. A touch screen, comprising: a main touch zone arranged in a portrait orientation having a top and a bottom, a first ancillary electrode and a second ancillary electrode, wherein the first ancillary electrode is arranged in a first peripheral zone of the touch screen and the second ancillary electrode is arranged in a second peripheral zone opposite to the first peripheral zone, the first peripheral zone and the second peripheral zone being on opposite sides of the main touch zone and respectively corresponding to edges of the main touch zone; wherein at least one of the first ancillary electrode and the second ancillary electrode has a length that is greater than a length of the corresponding one of the edges of the main touch zone;
   wherein the length of the second ancillary electrode is greater than length of the first electrode; and
   wherein a third ancillary electrode and a fourth ancillary electrode of same length are respectively provided on a third peripheral zone and a fourth peripheral zone of the touch screen, which are respectively located on the top and the bottom of the main touch zone that are different from the first and second peripheral zones, the first, second, third, and fourth ancillary electrodes being separate from each other, the length of the at least one of the first ancillary electrode and the second ancillary electrode is such that at least one of two opposite ends of the at least one of the first ancillary electrode and the second ancillary electrode corresponds to an end of one of the third and fourth ancillary electrodes.

2. The touch screen as claimed in claim 1, wherein the first ancillary electrode has a length less than or equal to a length of the first peripheral zone.

3. The touch screen as claimed in claim 2, wherein the first peripheral zone and the second peripheral zone each comprise an area from the corresponding one of the edges of the main touch zone of the touch screen to an outer frame of the touch screen.

4. The touch screen as claimed in claim 1, wherein the second ancillary electrode has a length less than or equal to a length of the second peripheral zone.

5. The touch screen as claimed in claim 4, wherein the first peripheral zone and the second peripheral zone each comprise an area from the corresponding one of the edges of the main touch zone of the touch screen to an outer frame of the touch screen.

6. The touch screen as claimed in claim 1, wherein the first peripheral zone and the second peripheral zone each comprise an area from the corresponding one of the edges of the main touch zone of the touch screen to an outer frame of the touch screen.

7. The touch screen as claimed in claim 1, wherein the touch screen comprises a capacitive touch screen.

8. A terminal device, comprising: a touch screen, the touch screen comprising a main touch zone arranged in a portrait orientation having a top and a bottom, a first ancillary electrode and the second ancillary electrode, wherein the first ancillary electrode is arranged in a first peripheral zone of the touch screen and the second ancillary electrode is arranged in a second peripheral zone opposite to the first peripheral zone, the first peripheral zone and the second peripheral zone being on opposite sides of the main touch zone and respectively corresponding to edges of the main touch zone; wherein at least one of the first ancillary electrode and the second ancillary electrode has a length that is greater than a length of the corresponding one of the edges of the main touch zone;
   wherein the length of the second ancillary electrode is greater than length of the first electrode; and
   wherein a third ancillary electrode and a fourth ancillary electrode are same length respectively provided on a third peripheral zone and a fourth peripheral zone of the touch screen, which are respectively located on the top and the bottom of two opposite sides of the main touch zone that are different from the first and second peripheral zones, the first, second, third, and fourth ancillary electrodes being separate from each other, the length of the at least one of the first ancillary electrode and the second ancillary electrode is such that at least one of two opposite ends of the at least one of the first ancillary electrode and the second ancillary electrode corresponds to an end of one of the third and fourth ancillary electrodes.

9. The terminal device as claimed in claim 8, wherein the first ancillary electrode has a length less than or equal to a length of the first peripheral zone.

10. The terminal device as claimed in claim 9, wherein the first peripheral zone and the second peripheral zone each comprise an area from the corresponding one of the edges of the main touch zone of the touch screen to an outer frame of the touch screen.

11. The terminal device as claimed in claim 8, wherein the second ancillary electrode has a length less than or equal to a length of the second peripheral zone.

12. The terminal device as claimed in claim 11, wherein the first peripheral zone and the second peripheral zone each comprise an area from the corresponding one of the edges of the main touch zone of the touch screen to an outer frame of the touch screen.

13. The terminal device as claimed in claim 8, wherein the first peripheral zone and the second peripheral zone each comprise an area from the corresponding one of the edges of the main touch zone of the touch screen to an outer frame of the touch screen.

14. The terminal device as claimed in claim 8, wherein the touch screen comprises a capacitive touch screen.

* * * * *